United States Patent
Bagabas et al.

(10) Patent No.: US 8,623,220 B2
(45) Date of Patent: Jan. 7, 2014

(54) SYNTHESIS OF COPPER OXIDE-DOPED ZINC-OXIDE NANOPARTICLES AND THEIR USE

(75) Inventors: Abdulaziz A Bagabas, Riyadh (SA); Ahmed S. Alshammari, Riyadh (SA); Mohamed F. Aboud, Cairo (EG); Mohamed Mokhtar Mohamed Mostafa, Cairo (EG); Emad Addurihem, Riyadh (SA); Zeid A. Al-Othman, Riyadh (SA); Musaed A Alangari, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 0 days.

(21) Appl. No.: 13/549,224

(22) Filed: Jul. 13, 2012

(65) Prior Publication Data

US 2013/0168328 A1    Jul. 4, 2013

Related U.S. Application Data

(63) Continuation-in-part of application No. 13/342,104, filed on Jan. 1, 2012, now Pat. No. 8,252,256.

(60) Provisional application No. 61/617,025, filed on Mar. 28, 2012.

(51) Int. Cl.
*B01J 35/00* (2006.01)

(52) U.S. Cl.
USPC ...... 210/748.14; 210/904; 502/343; 977/775; 977/896; 977/903

(58) Field of Classification Search
USPC ............. 210/748.14, 904; 977/775, 896, 903; 502/343
See application file for complete search history.

(56) References Cited

FOREIGN PATENT DOCUMENTS

KR     2002-044758     *  6/2002

OTHER PUBLICATIONS

Bao et al., Preparation of mesoporous Cu/ZnO catalyst and its application in low-temperature methanol synthesis, Catalysis Communications 9 (2008) 913-918.

Kim et al., Effect of electrical conduction properties on magnetic behaviors of Cu-doped ZnO thin films, Physica B 405 (2010) 4678-4681.

Li et al., Facile synthesis and photocatalytic activity of ZnO-CuO nanocomposite, Superlattices and Microstructures 47 (2010) 615-623.

Look et al., As-doped p-type ZnO produced by an evaporation/sputtering process, Applied Physics Letters vol. 85, No. 22 Nov. 29, 2004, 5269-5271.

Frank J. Owens, Room temperature ferromagnetism in Cu-doped ZnO synthesized from CuO and ZnO nanoparticles, Journal of Magnetism and Magnetic Materials 321(2009) 3734-3737.

Wang et al. Aggregation-based growth and magnetic properties of inhomogeneous Cu-doped ZnO nanocrystals, Applied Physics Letters 90, 212502 (2007), 1-3.

* cited by examiner

*Primary Examiner* — Steven Bos
(74) *Attorney, Agent, or Firm* — Geeta Kadambi; Riddhi IP LLC

(57) ABSTRACT

A simple, room-temperature method of producing CuO-doped zinc oxide nanoparticles was established by reacting zinc nitrate hexahydrate, copper nitrate trihydrate and cyclohexylamine (CHA) at room temperature. These nanoparticles may be used for photocatalytic degradation of cyanide in aqueous solutions. The degradation of cyanide is effective because electrons transfer from the p-type copper oxide to the n-type zinc oxide.

6 Claims, 7 Drawing Sheets

SYNTHESIS OF COPPER OXIDE-DOPED ZINC-OXIDE NANOPARTICLES AND THEIR USE

CROSS REFERENCE TO RELATED APPLICATION

This application is a continuation-in-part application and claims priority to U.S. patent application Ser. No. 13/342,104, filed on Jun. 7, 2011, now an U.S. Pat. No. 8,252,256 and Provisional Application 61/617,025, filed on Mar. 28, 2012. Both applications are hereby incorporated by reference in their entireties for all their teachings.

FIELD OF TECHNOLOGY

This disclosure generally relates to synthesis and characterization of novel copper oxide-doped zinc oxide nanoparticles (CuO-doped ZnO nanoparticles) at ambient temperature and pressure; and using the said nanoparticles for photocatalytically degrading cyanide present in soil or water as toxic contaminant.

BACKGROUND

Zinc oxide (ZnO), a II-VI semiconductor with broad range of applications due to its unique properties. In addition, its relatively low cost, superior chemical and mechanical stability (Look D. C. 2001), the availability of large-area substrates with desirable c-axis preferential growth nature and technological compatibility with the conventional silicon process (Lee et al., 2001) make it very desirable compound for many applications.

Alteration of ZnO's specifications, electronic and optical properties in particular, can be made by doping it with transition metals such as manganese, iron, cobalt, nickel, copper and lanthanides (europium, erbium, and terbium).

The Cu-doped ZnO semiconductor research was mainly directed to catalytic applications such as methanol synthesis (Bao et al. 2008), production of hydrogen by partial oxidation of methanol (POM) (Schuyten et al. 2009), carbon monoxide oxidation (Taylor et al. 2003), degradation of textile dye pollutants within aqueous solutions (Satish Kumar et al. (2011) and dilute magnetic semiconductors for spintronic devices (Kim et al. 2010, Wang et al. 2007).

Copper forms in different bonding states within ZnO lattice such as metallic)($Cu^0$, monovalent ($Cu^I_2O$) and divalent ($Cu^{II}O$), depending on the annealing conditions (temperature and oxygen pressure), where the fully oxidized divalent state $Cu^{2+}$ is favored when the above conditions are promoted otherwise other states would be present.

There is a need for an easier method to make nanoparticles in an efficient way for industrial use.

SUMMARY

The instant invention describes a novel method for synthesizing CuO-doped ZnO nanoparticles and their use for photocatalytic degradation of cyanide using the CuO-doped ZnO nanoparticles. The CuO-doped ZnO nanoparticles are used as catalysts for photocatalytically degrading cyanide in aqueous solutions.

In one embodiment, method of synthesizing CuO-doped ZnO nanoparticles at room temperature from zinc nitrate hexahydrate, copper nitrate trihydrate and cyclohexylamine (CHA) in aqueous solution is described. In another embodiment, various mole ratios of zinc nitrate hexahydrate, copper nitrate trihydrate and cyclohexylamine are described. The mole ratio of copper nitrate trihydrate to zinc nitrate hexahydrate to cyclohexylamine ranges from 1:23:48 to 1:117:236. In one embodiment, once copper nitrate trihydrate, zinc nitrate hexahydrate and cyclohexylamine were mixed together, were stirred for a week, and precipitate is harvested. The precipitate, in another embodiment, is filtered and dried. The dried precipitate was then calcined at 500° C. for three hours. Thus the calcined precipitate was the CuO-doped ZnO nanoparticles to be used for photocatalytic degradation of cyanide.

In one embodiment, a co-precipitation method using a moderate base of cyclohexylamine (CHA) without using any organic template or surfactant at ambient temperature and pressure was performed. In another embodiment, the resultant CuO-doped ZnO nanoparticles produces copper-substituted ZnO wurtzite lattice structure nanoparticles, regardless of doping concentration of weight percents of copper oxide at 1-4 percent.

In another embodiment, characterizations of several properties of the novel CuO-doped ZnO nanoparticles were performed. These characterizations were performed to prove the purity and efficacy of the prepared CuO-doped ZnO nanoparticles as well as to demonstrate the current methods efficiency and effectiveness.

In one embodiment, the CuO-doped ZnO nanoparticles with different weight loading percentage of CuO were used to photo-catalytically degrade cyanide present solution or solids.

The novel method of synthesizing CuO-doped ZnO nanoparticles and method of using them in the photocatalytic degradation of cyanide in aqueous solutions, disclosed herein, may be implemented in any means for achieving various aspects. Other features will be apparent from the accompanying figures and from the detailed description that follows.

BRIEF DESCRIPTION OF THE DRAWINGS

Example embodiments are illustrated by way of example and no limitation in the tables and in the accompanying figures, like references indicate similar elements and in which.

Other features of the present embodiments will be apparent from the accompanying figures, tables and from the detailed description that follows.

DETAILED DESCRIPTION

Several embodiments for a process of synthesizing, characterization and method of using CuO-doped ZnO nanoparticles in the photo-catalytic degradation of cyanide are disclosed. The CuO-doped ZnO nanoparticles are used as a catalyst in the solution to degrade cyanide.

Synthesis of CuO-doped ZnO Nanoparticles:

Materials—

Copper nitrate trihydrate (98-103%, Fluka), zinc nitrate hexahydrate (pure, POCH), and cyclohexylamine (GC>99%, Merck) were commercially available and were used without further purification. Deionized water (18.2 MΩ.cm) was obtained from a Milli-Q water purification system (Millipore).

Method of Making and Characterization of the Undoped ZnO and CuO-doped ZnO Nanoparticles:

As described previously (U.S. patent application Ser. No. 13/342,104) and incorporated herein in its entirety zinc nitrate hexahydrate was mixed with cyclohexylamine in water in 1:2 mol ratio at room temperature to prepare undoped ZnO precipitate as ZnO nanoparticle, which was calcined at 500° C. for three hours.

Figure 1:
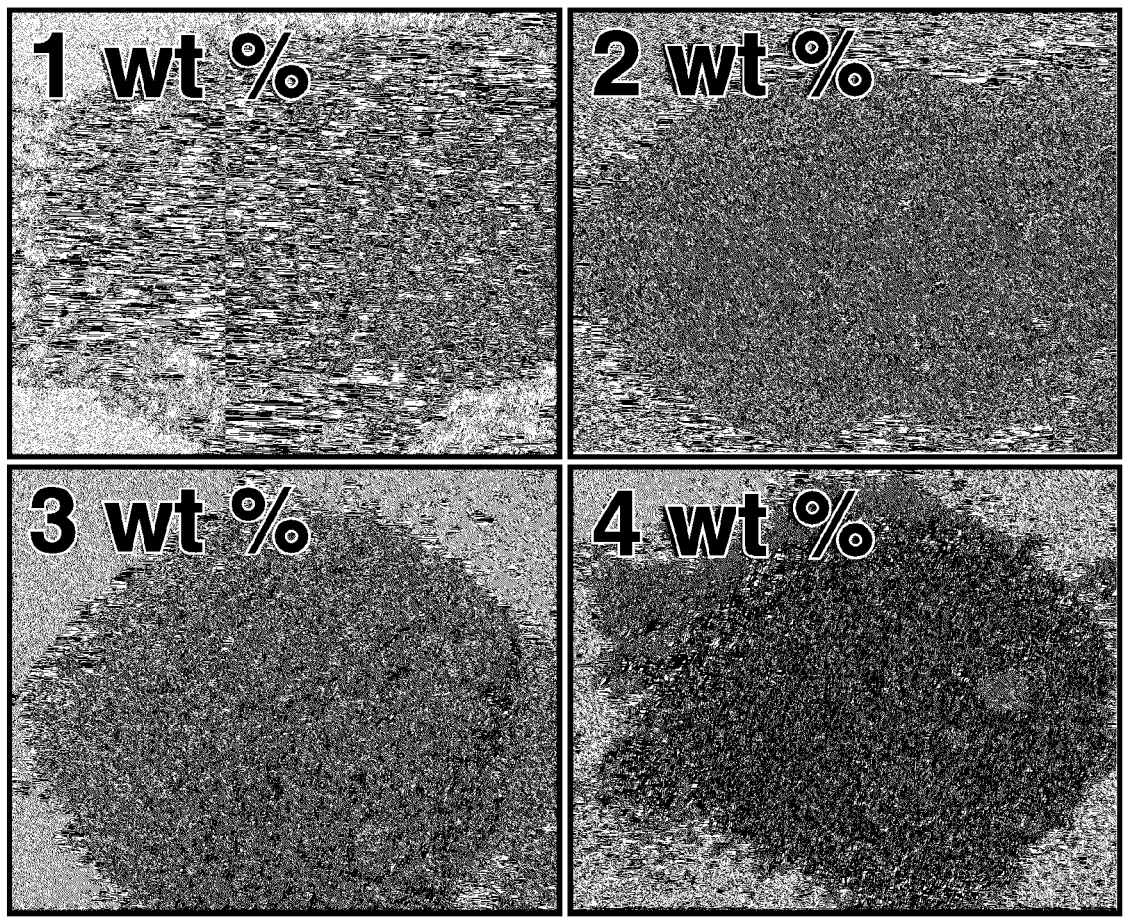
FIG. 1 shows calcined CuO-doped ZnO nanoparticles of various CuO doping.

Calculated amounts of zinc nitrate hexahydrate, copper nitrate trihydrate, and cyclohexylamine were mixed according to the mol ratios as shown in Table 1. For each mixture, metal nitrate precursors were first mixed and dissolved in 500 ml of deionized water at room temperature, under continuous magnetic stifling. The addition of cylcohexylamine resulted in a very light blue precipitate. Depth of blue color increased with increasing the copper content. The reaction mixtures were left stifling for one week. The precipitates were filtered off through F-size fritted filters, and then were copiously washed with deionized water. The precipitates were dried under vacuum for one day. After drying, the precipitates were mixed with 300 ml water and were magnetically stirred for one day for the removal of any impurity. The precipitates were filtered off, air-dried, and then calcined at 500° C. for three hours. Brown solids were obtained after calcination. The depth of brown color increased with increasing the copper oxide content from 1 to 4% (specific concentration)(FIG. 1).

TABLE 1

Mole ratio of copper nitrate to zinc nitrate to CHA for preparing the catalyst precursors.

| Precursor (wt %) | $Cu^{2+}:Zn^{2+}:CHA$ mol ratio |
|---|---|
| 1 | 1:117:236 |
| 2 | 1:47:97 |
| 3 | 1:31:65 |
| 4 | 1:23:48 |

Materials Characterization: Inductively-coupled plasma (ICP) was used to determine the copper and zinc component in the calcined CuO-doped ZnO nanoparticles, obtained at 500° C. X-ray diffraction (XRD) patterns were recorded for phase analysis and crystallite size measurement on a Philips X pert pro diffractometer, operated at 40 mA and 40 kV by using $CuK_\alpha$ radiation and a nickel filter, in the 2 theta range from 2 to 80° in steps of 0.02°, with a sampling time of is per step. The crystallite size was estimated using Scherer's equation. XRD patterns were recorded for $Cu^{2+}$-doped ZnO nanoparticles before and after calcination.

The morphology CuO-doped ZnO nanoparticles (size and shape) was investigated using a field emission scanning electron microscope (FE-SEM model: FEI-200NNL) and a high resolution transmission electron microscope (HRTEM model: JEM-2100F JEOL). Carbon-coated copper grids were used for mounting the samples for HRTEM analysis. Elemental microanalysis of the surface was performed by energy dispersive X-ray spectroscopy (EDX), which is coupled to FE-SEM.

UV-Vis absorption spectra for $Cu^{2+}$-doped ZnO materials before and after calcination were recorded on a Perkin Elmer Lambda 950 UV/Vis/NIR spectrophotometer, equipped with 150 mm snap-in integrating sphere for capturing diffuse and specular reflectance.

Photocatalytic Evaluation: All the experiments were carried out using a horizontal cylinder annular batch reactor. A black light-blue florescent bulb (F18W-BLB) was positioned at the axis of the reactor to supply UV illumination. Reaction suspension was irradiated by UV light of 365 nm at a power of 18 W. The experiments were performed at room temperature by suspending 0.02 wt % of CuO-doped ZnO sample into 300 ml, 100 ppm potassium cyanide at pH 8.5, adjusted by ammonia solution. This specific pH value was chosen on the basis of previous investigation, revealed the preferred adsorption of $OH^-$ ion over $CN^-$ ion at higher pH values, while hydrogen cyanide, HCN, elevates at pH≤7 according to the following equation:

$$CN^-_{(aq)} + H_2O_{(l)} = HCN_{(g)} + OH^-_{(aq)}$$

The reaction was carried out isothermally at 25° C. and a sample of the reaction mixture was taken after 120 minutes. The $CN^-$ content in the solution after reaction time was analyzed by volumetric titration with $AgNO_3$. The removal efficiency of $CN^-$ has been measured by applying the following equation:

% Removal efficiency=$(C_o-C)/C_o \times 100$, where $C_o$ the original cyanide content and C the retained cyanide in solution.

The physical observation of the $Cu^{2+}$-doped ZnO nanoparticles samples after calcination (FIG. 1) was evident for increasing the copper oxide content through the increase in color depth. Table 2 confirms that the theoretical and experimental, obtained by ICP, CuO content in the calcined samples were in good agreement.

TABLE 2

Theoretical and experimental results of CuO content in the CuO-doped ZnO catalysts.

| Sample | Theoretical (wt %) | Experimental (wt %) |
|---|---|---|
| 1% CuO/ZnO | 1 | 0.7 |
| 2% CuO/ZnO | 2 | 1.9 |
| 3% CuO/ZnO | 3 | 2.9 |
| 4% CuO/ZnO | 4 | 3.9 |

Figure 2A:
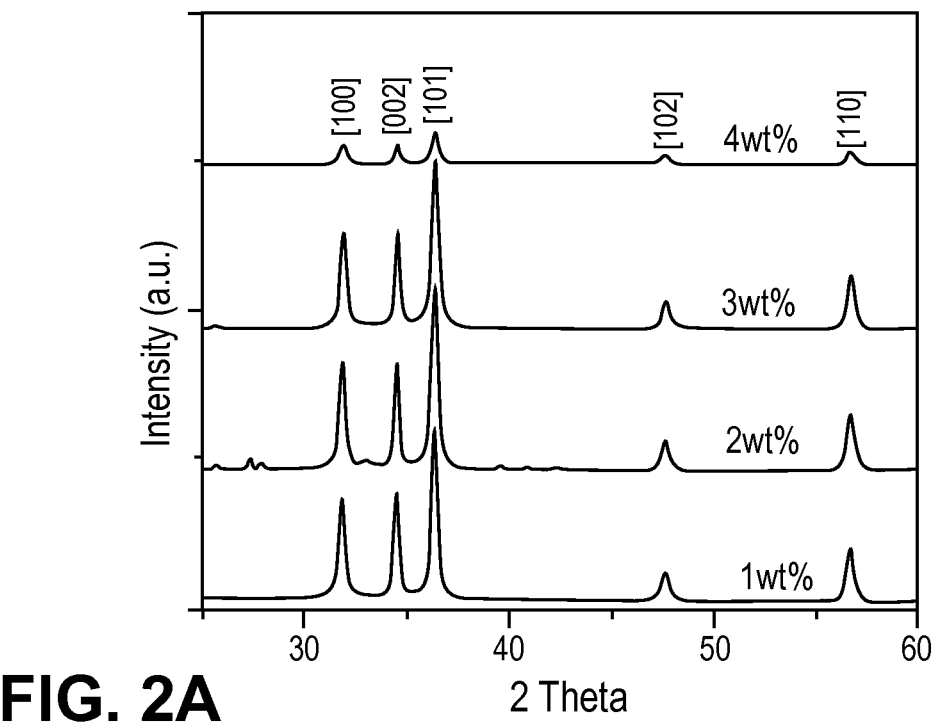
FIG. 2 shows X-ray diffraction (XRD) patterns of CuO/ZnO samples with varying copper oxide concentration before (2A) and after calcination (2B, 2C).
Figure 2B:
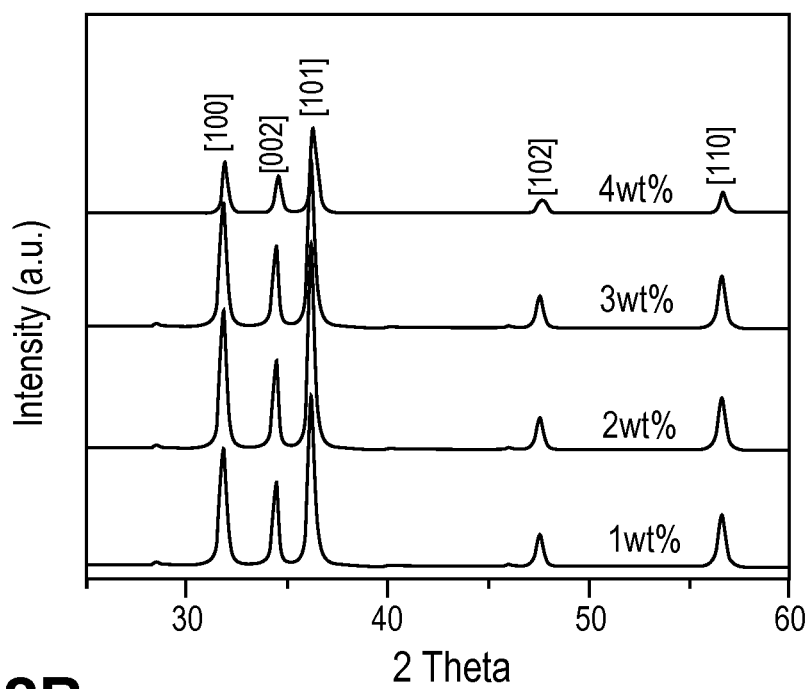

FIG. 2 shows the XRD spectra of the CuO/ZnO samples with varying the copper concentration from 1 to 4 weight percent before (2A) and after calcination (2B). No indication of any copper secondary phases was observed upon incorporation of copper for all the samples. The absence of secondary phases could be attributed either to the complete solubility of copper within ZnO, which is higher than the reported solubility limit value of 1% and the 3% reported in the literature. The low solubility was attributed to the high covalent character in Cu—O bonding, resulted from the high localization of 3D state on copper. It is also likely that the high dispersion of copper phases within ZnO phase prevented its detection by XRD technique. However, this possibility was excluded on the basis of XRD results, explained below, and on the basis of the TEM results. The other possibility of not detecting any copper phase due to its amorphous nature was also ruled out on the basis of the TEM results, which showed the crystal planes.

Figure 2C:
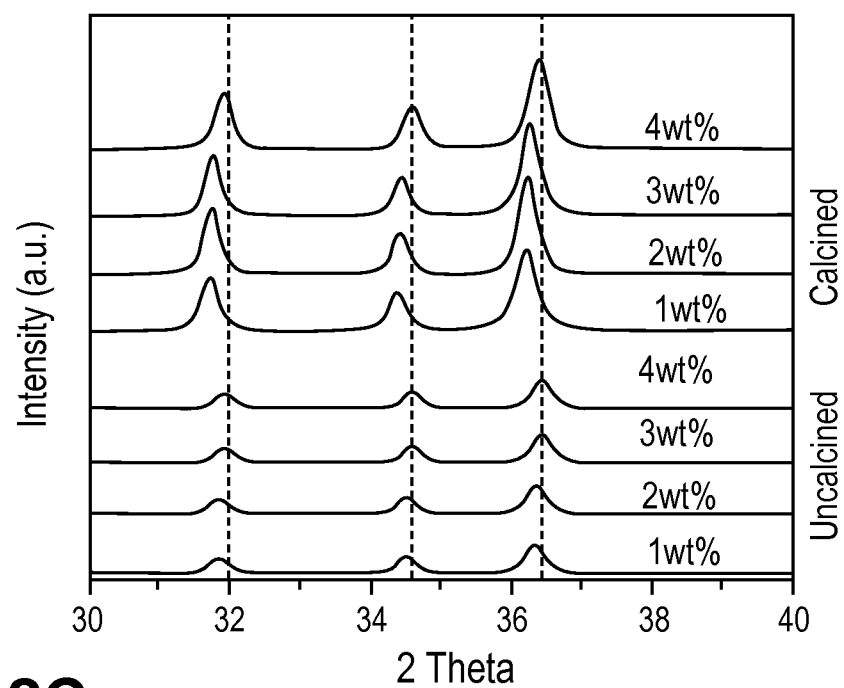

The shift of the ZnO peaks (for instance 100, 002, and 101) to higher 2θ is a result of replacing $Zn^{2+}$ (0.060 nm) by the smaller $Cu^{2+}$ ions (0.057 nm) in the wurtzite lattice. The shift in the uncalcined samples was more pronounced than the calcined samples due to the decrease in defects, resulting from copper substitution upon calcinations (FIG. 2C). No copper phases were detected by XRD for the uncalcined or the calcined samples which confirms complete substitution of $Cu^{2+}$ in the ZnO wurtzite lattice even at room temperature. The average crystallite size of CuO-doped ZnO catalysts was estimated by Scherrer equation for the crystallographic phases (100), (002), and (101). The average crystallite size was not affected by the CuO wt % content (1 wt %: 32.48 nm; 2 wt %: 33.34 nm; 3 wt %: 33.47 nm; 4 wt %: 33.60 nm).

The importance of having complete solubility in our CuO/ZnO catalyst systems is to produce a coupled system instead of having two independent ZnO and CuO composites such as those systems used in hetrojunctions that may not be in harmony with each other and minimize the charge transfer from one to another.

Figure 3A:
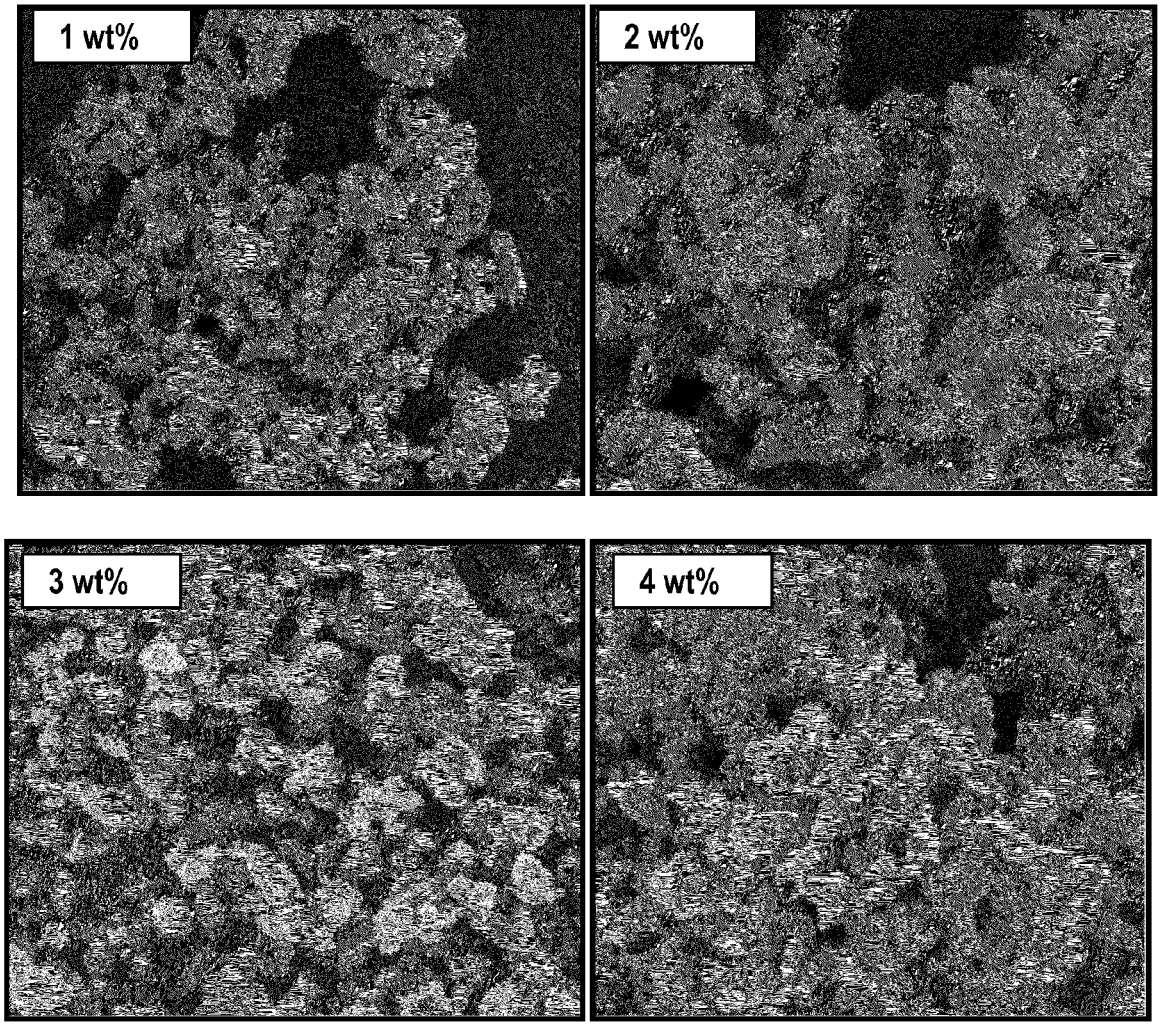
FIG. 3 shows the scanning electron microscopy (SEM) micrographs (3A) and the element analysis (3B) for the calcined CuO-doped ZnO nanoparticles.
Figure 3B:
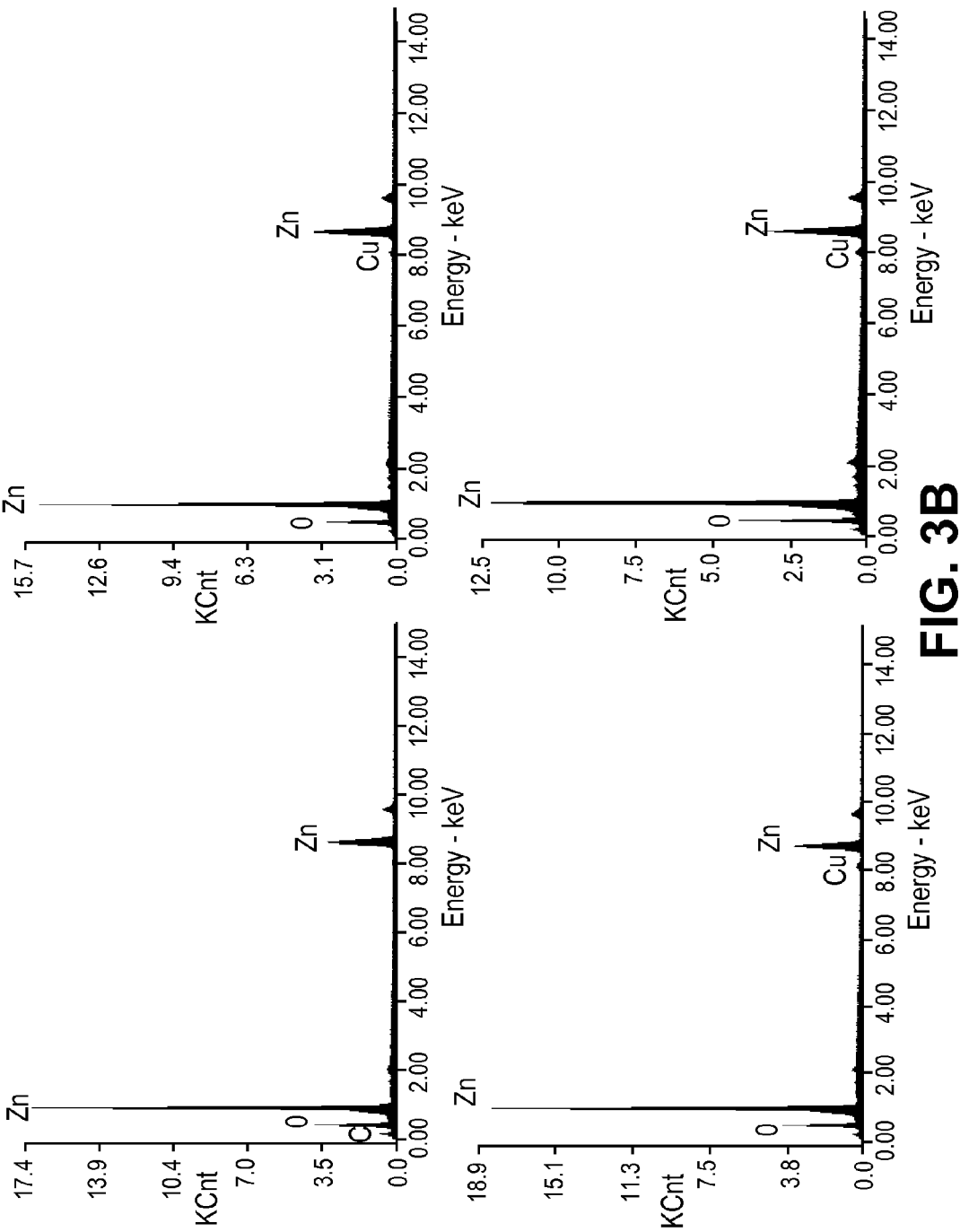

FIG. 3A shows the SEM micrographs for the calcined CuO-doped ZnO samples. The same morphology was observed in all samples irrespective of CuO wt %. The particles were agglomerated in rice-like shape. The elemental microanalysis of the surface (quality) by EDX (FIG. 3B) confirmed the purity of the calcined samples and the presence of copper, zinc, and oxygen on their surfaces. However, the surfaces are rich in zinc, which is consistent with the oxygen-deficiency for the n-type ZnO. In addition, the copper peak intensity increased with increasing the copper oxide content from 1 to 4%, as shown in EDX result (FIG. 3B).

Figure 4:
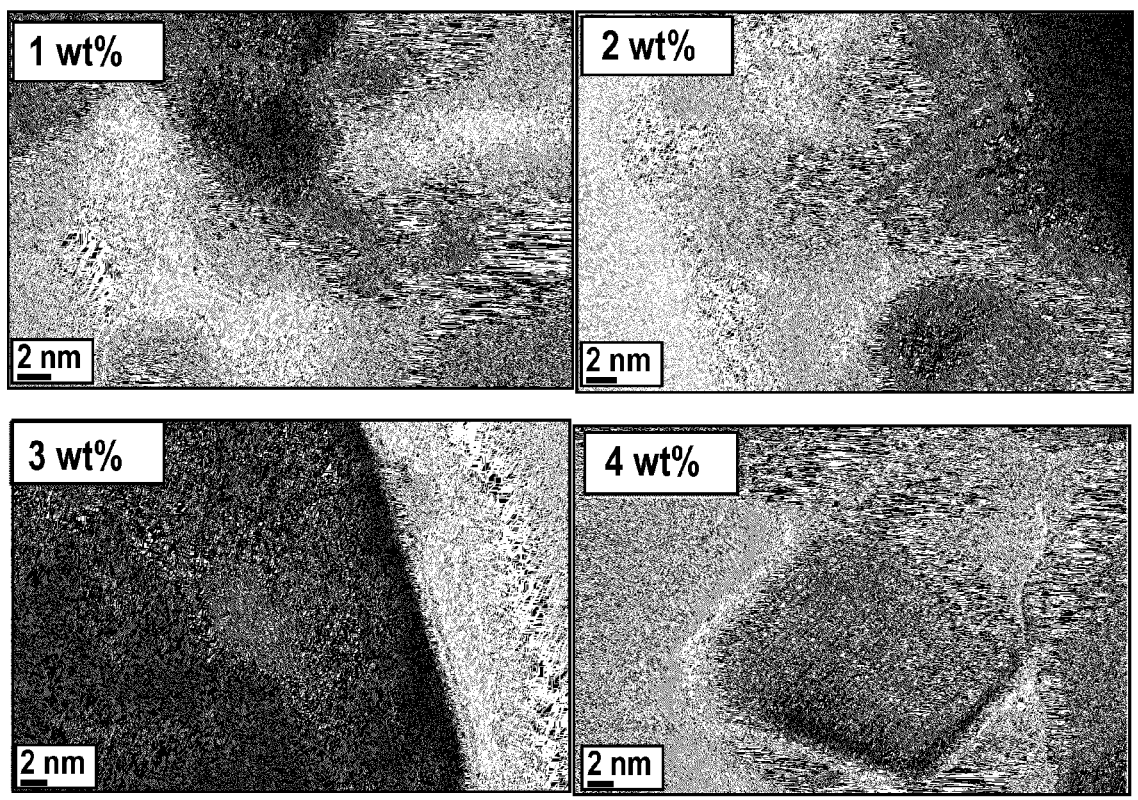
FIG. 4 shows high resolution TEM micrographs for the calcined CuO-doped ZnO nanoparticles.

FIG. 4 shows high resolution TEM micrographs for the calcined CuO-doped ZnO samples. All the samples show similar morphology and particle size irrespective of CuO wt % doping. The particles have different shapes such as rectangular- and round-like. The average size of the nanoparticles ranged from 5 to 20 nm. The lattice fringes, in addition, match those of ZnO only, which supports the results obtained from XRD, indicating the replacement of $Zn^{2+}$ Ions by $Cu^{2+}$ ions in the wurtzite lattice of ZnO.

Figure 5:
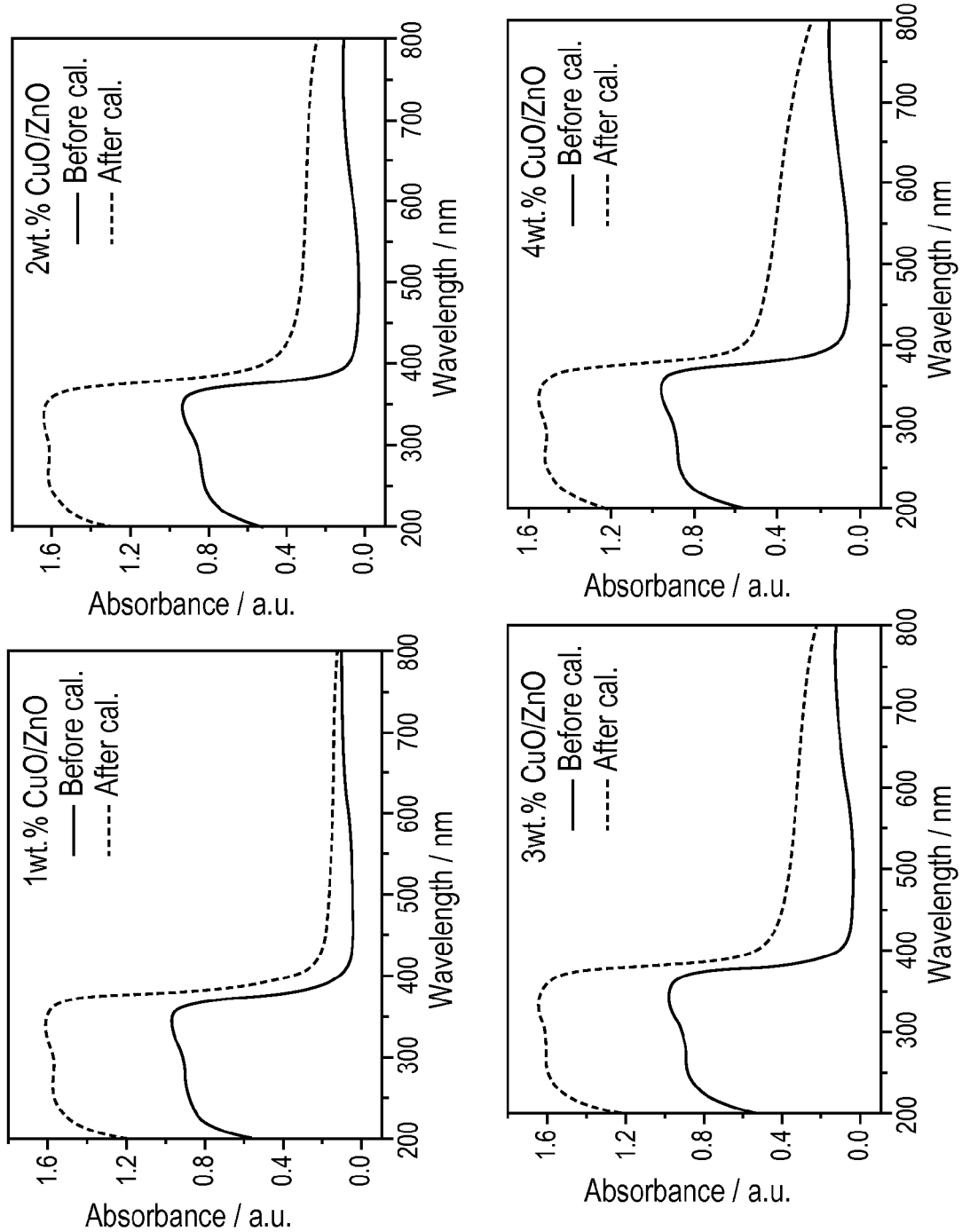
FIG. 5 shows the UV-Vis absorption spectra for copper oxide doped ZnO nanoparticles before and after calcination.

FIG. 5 shows the UV-Vis absorption spectra for the copper oxide doped ZnO samples before and after calcination. The incorporation of $Cu^{2+}$ is responsible for ZnO $E_g$ reduction, i.e. red shift. As shown in Table 3, a slight shift in the $E_g$ of ZnO with increasing the content of CuO from 1 to 4 wt % was observed.

TABLE 3

Band gap energy of the $Cu^{2+}$-doped ZnO samples before and after calcination.

| Sample | Eg/eV (Uncalcined) | Eg/eV (Calcined) |
|---|---|---|
| 1% CuO/ZnO | 3.24 | 3.21 |
| 2% CuO/ZnO | 3.22 | 3.20 |
| 3% CuO/ZnO | 3.22 | 3.19 |
| 4% CuO/ZnO | 3.21 | 3.19 |

The $E_g$s of the uncalcined and calcined samples were almost comparable. This result might imply that $Cu^{2+}$ substituted $Zn^{2+}$ in ZnO wurtzite lattice at room temperature, which was also supported by X-ray results. However, the small red shift in the $E_g$s of the calcined samples could be due to the enhancement of copper substitution upon calcinations.

The red shift in the calcined samples was less compared to the reported $E_g$ (2.9 eV) for CuO/ZnO nanoparticle, which was prepared physically by wet impregnation method and attributed to the stoichiometry deficiency of ZnO due to impregnated CuO [13]. The $E_g$ reduction (band offsets) in our solid solution system may be attributed to the following effects:
1) The strong d-p coupling between copper and oxygen moves O 2p orbital up, that narrows the direct fundamental $E_g$ of ZnO.
2) Creation of impurity energy band, especially at higher concentrations, above the ZnO valance band maximum (VBM) which creates a mixture of direct and indirect transitions.

Effect of CuO Doping on Photocatalytic Activity

Table 4 shows the effect of CuO doping on photocatalytic performance, which was investigated by changing the doping wt % from 0 to 4 under the aforementioned reaction conditions as above. The results showed that the un-doped ZnO catalyst gave a reasonable photocatalytic activity. However, the CuO-doped ZnO catalysts exhibited better activity with increasing the CuO content from 1 to 3 wt %. Nevertheless, increasing the CuO content to 4 wt % did not enhance the photocatalytic activity. This finding might be due to the identical $E_g$ of both 3% and 4 wt % CuO-doped ZnO catalysts.

TABLE 4

The effect of CuO wt % on photocatalytic activity

| Sample | % of cyanide degradation |
|---|---|
| ZnO | 56 |
| 1% CuO/ZnO | 89 |
| 2% CuO/ZnO | 93 |
| 3% CuO/ZnO | 97 |
| 4% CuO/ZnO | 97 |

The enhancement in photocatalytic degradation of cyanide ion with increasing the CuO wt % content could be attributed to the inhibition of electron-hole pair recombination and efficient separation of the charges. Such easy transfer of electrons from CuO to ZnO is due to the close match of work function between CuO and ZnO (5.3 eV).

The instant Cu-doped ZnO nanoparticles showed enhancement in the photocatalytic performance due to $E_g$ reduction. Furthermore, the narrow $E_g$ of CuO (1.7, 1.33 eV) results in efficient separation of charges, which were photo-generated in the copper oxides/zinc oxide under UV light illumination and suppressed their recombination. The mechanism of the photo-generated charges separation is due to their transfer between the two semiconductor materials (p-type copper oxides/n-type zinc oxide) as follows; the photogenerated electrons transfer from the conduction band (CB) of CuO to that of ZnO, while the photogenerated holes immigrate in the opposite direction from the valance band (VB) of ZnO to that of CuO. Consequently, more electrons are accumulated in the conduction band of ZnO while more holes are accumulated in the valence band of CuO.

Although the present embodiments have been described with reference to specific example embodiments, it will be evident that various modifications and changes may be made to these embodiments without departing from the broader spirit and scope of the various embodiments. In addition, the specification and drawings are to be regarded in an illustrative rather than as in a restrictive sense.

What is claimed is:
1. A process, comprising;
reacting zinc nitrate hexahydrate, copper nitrate trihydrate and cyclohexylamine at a specific ratio to form a blue precipitate;

calcining the blue precipitate to form CuO-doped zinc oxide nanoparticles; and removing cyanide ion from an aqueous solution of cyanide using a specific weight percent of the CuO-doped zinc oxide nanoparticles as a photocatalyst having a specific shape and an average size, by photocatalytic degradation for a specific time.

2. The process of claim 1, wherein the specific ratio of copper nitrate trihydrate to zinc nitrate hexahydrate to cyclohexylamine is between 1:23:48 to 1:117:236.

3. The process of claim 1, wherein the specific time is 120 minutes.

4. The process of claim 1, wherein the average size is between 5 to 20 nm.

5. The process of claim 1, wherein the specific shape is rectangular and/or round.

6. The process of claim 1, wherein the specific weight percent is one of 1%, 2%, 3% or 4%.

* * * * *